United States Patent
Noujeim et al.

(10) Patent No.: US 10,754,030 B2
(45) Date of Patent: Aug. 25, 2020

(54) METHODS AND SYSTEMS FOR RADAR SIMULATION AND OBJECT CLASSIFICATION

(71) Applicant: Baidu USA LLC, Sunnyvale, CA (US)

(72) Inventors: Karam Noujeim, Sunnyvale, CA (US); Mei-Li Chi, Sunnyvale, CA (US); Vikalp Mishra, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 130 days.

(21) Appl. No.: 16/168,516

(22) Filed: Oct. 23, 2018

(65) Prior Publication Data

US 2020/0124718 A1    Apr. 23, 2020

(51) Int. Cl.
*G06K 9/00* (2006.01)
*G01S 13/931* (2020.01)
*G05D 1/02* (2020.01)
*G01S 7/41* (2006.01)

(52) U.S. Cl.
CPC ............ *G01S 13/931* (2013.01); *G01S 7/412* (2013.01); *G05D 1/0221* (2013.01); *G05D 1/0257* (2013.01); *G05D 1/0274* (2013.01); *G01S 2013/932* (2020.01)

(58) Field of Classification Search
CPC .. G01S 13/931; G01S 7/412; G01S 2013/932; G05D 1/0221; G05D 1/0257; G05D 1/0274
See application file for complete search history.

(56) References Cited

U.S. PATENT DOCUMENTS

| | | | |
|---|---|---|---|
| 8,872,693 B1* | 10/2014 | Malas | G01S 7/412 342/195 |
| 9,606,539 B1* | 3/2017 | Kentley | G01S 7/4972 |
| 10,489,972 B2* | 11/2019 | Atsmon | G06T 19/006 |
| 10,593,042 B1* | 3/2020 | Douillard | G01S 17/89 |
| 2013/0038486 A1* | 2/2013 | Lee | G01S 7/412 342/192 |
| 2017/0115378 A1* | 4/2017 | Haghighi | G01S 7/4052 |
| 2017/0123421 A1* | 5/2017 | Kentley | B60W 30/00 |
| 2017/0132334 A1* | 5/2017 | Levinson | G06F 30/20 |
| 2017/0132335 A1* | 5/2017 | Pechberti | G06F 30/20 |
| 2017/0132934 A1* | 5/2017 | Kentley | G08G 1/202 |
| 2018/0011954 A1* | 1/2018 | Micks | G06F 30/15 |
| 2018/0060725 A1* | 3/2018 | Groh | G06N 7/005 |
| 2018/0136651 A1* | 5/2018 | Levinson | G05D 1/0027 |
| 2018/0143299 A1* | 5/2018 | Chabaud | G01S 7/354 |

(Continued)

*Primary Examiner* — Sean T Motsinger
(74) *Attorney, Agent, or Firm* — Womble Bond Dickinson (US) LLP

(57) ABSTRACT

Methods and systems for generating radar data are disclosed. A scene is defined based on map and route information, where the scene includes one or more objects. Values are assigned to a set of object parameters that describe each of the objects in the defined scene to produce one or more sets of object parameters describing the object(s). The defined scene and the set(s) of object parameters are used to generate scattering data associated with the defined scene. Based on the scattering data and the map and route information, radar data is generated that includes radar information of each object in the defined scene, where the generated radar data is used to train a predictive model to classify each of the identified objects.

18 Claims, 8 Drawing Sheets

(56) References Cited

U.S. PATENT DOCUMENTS

| | | | |
|---|---|---|---|
| 2018/0275658 A1* | 9/2018 | Iandola | G06F 30/20 |
| 2019/0138848 A1* | 5/2019 | Gonzalez Aguirre | G06K 9/6202 |
| 2019/0227553 A1* | 7/2019 | Kentley-Klay | G05D 1/0088 |
| 2019/0228571 A1* | 7/2019 | Atsmon | G06T 19/006 |
| 2019/0295335 A1* | 9/2019 | Amelunxen | G09B 19/14 |
| 2019/0302259 A1* | 10/2019 | Van Fleet | G06T 1/20 |
| 2019/0303759 A1* | 10/2019 | Farabet | G06K 9/00791 |
| 2019/0383898 A1* | 12/2019 | Alidio | H04B 7/086 |
| 2020/0074266 A1* | 3/2020 | Peake | G05D 1/0231 |
| 2020/0111382 A1* | 4/2020 | Sarabandi | G09B 9/54 |
| 2020/0124718 A1* | 4/2020 | Noujeim | G05D 1/0274 |

* cited by examiner

METHODS AND SYSTEMS FOR RADAR SIMULATION AND OBJECT CLASSIFICATION

TECHNICAL FIELD

Embodiments of the present disclosure relate generally to radars. More particularly, embodiments of the disclosure relate to methods and systems for radar simulation and object classification.

BACKGROUND

Radar (also referred to as radio detection and ranging) is an object-detection system that uses radio waves to determine, among other things, the range, angle, or velocity of objects. It can be used, for example, to detect aircraft, ships, spacecraft, guided missiles, motor vehicles, weather formations, and terrain. Radars have been used in many applications, including autonomous driving systems (e.g., autonomous vehicle), air and terrestrial traffic control, air-defense systems, antimissile systems, aircraft anti-collision systems, ocean surveillance systems, and the like.

As previously discussed, radar has been utilized for measuring the velocity of objects. Unlike a light detection and range (LIDAR) system or a camera system, however, radar has not been utilized for objection classification. The main reason is due to the lack of (or insufficient) radar data available for machine learning (i.e., to train a set of rules, algorithms, and/or predictive models). As an example, for an autonomous driving application, in order to generate and collect sufficient radar data for machine learning, a vehicle having a radar system mounted thereon would need to be driven through numerous locations which is an exhausting and time-consuming process.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
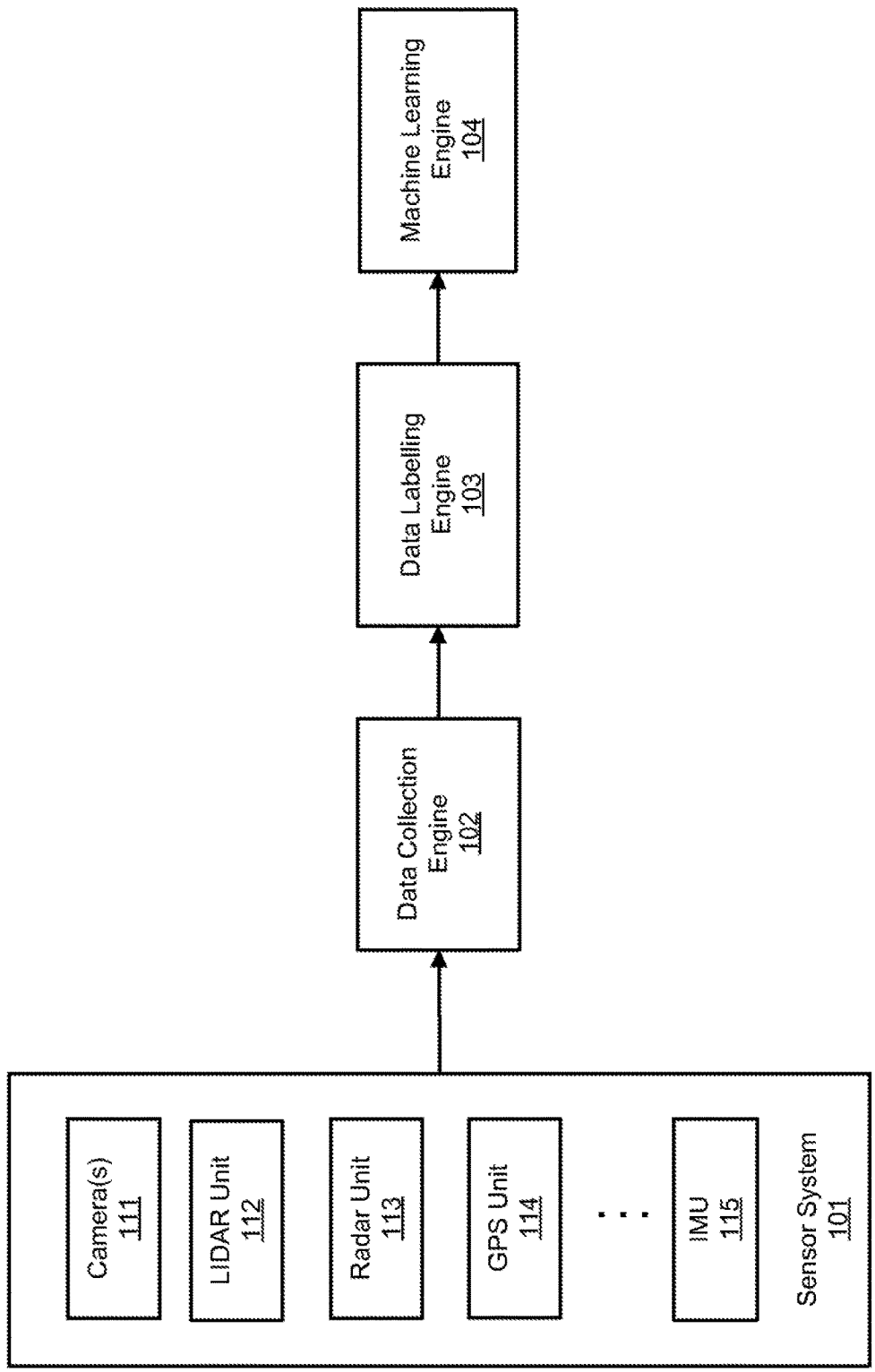
FIG. 1 is a block diagram illustrating a machine learning system.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment", "an embodiment", or "some embodiments" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, a radar simulator generates radar data based on radar cross section (RCS) signatures or features representing different types of objects within a defined or modeled scene, such as a car, a pedestrian, a motorcycle, a bicycle, a bus, a truck, a building, traffic related signs (e.g., stop signs, yield signs), etc. within an environment. RCS refers to a description of how an object (also refers to as target) reflects an incident electromagnetic wave. The RCS signatures are calculated or predicted using scattering data (e.g., scattering centers) obtained from a scattering data harvester or generated using an electromagnetic scattering simulator. The generated radar data is utilized by a machine learning engine to train or generate a radar classification model that classifies the objects in the environment. In this way, the time-consuming process of generating and collecting radar data, for example by driving a vehicle having a radar system mounted thereon through numerous locations, can be avoided.

In one embodiment, a scene is defined based on map and route information, where the scene includes one or more objects. Values are assigned to a set of object parameters that describe each of the objects in the defined scene to produce one or more sets of object parameters describing the object (s). The defined scene and the set(s) of object parameters are used to generate scattering data associated with the defined scene. Based on the scattering data and the map and route information, radar data is generated that includes radar information of each object in the defined scene, where the generated radar data is used to train a predictive model to classify each of the identified objects.

In one embodiment, to generate radar data that includes radar information of each object in the defined scene, for each of the objects in the defined scene, location information of the object is determined based on the map and route information. One or more radar cross sections (RCSs) of the object are predicted using the scattering data.

Additionally, in one embodiment, to generate radar data that includes radar information of each object in the defined scene, an RCS signature for the object is constructed using the RCS(s). The radar information of the object is determined based on the location information and the RCS signature for the object.

FIG. 1 is a block diagram illustrating a machine learning system. Referring to FIG. 1, machine learning system 100 includes sensor system 101, data collection engine 102, data labelling engine 103, and machine learning engine 104. Sensor system 101 is configured to provide sensor data from a number of components or systems. As shown, sensor system 101 includes, but it is not limited to, one or more cameras 111, a light detection and range (LIDAR) unit 112, radar unit 113, global positioning system (GPS) unit (or system) 114, and inertial measurement unit (IMU) 115. GPS system 114 may include a transceiver operable to provide information regarding the position of the autonomous vehicle. IMU unit 115 may sense position and orientation changes of the autonomous vehicle based on inertial acceleration. Radar unit 113 may represent a system that utilizes radio signals to sense objects within the local environment of the autonomous vehicle. In some embodiments, in addition to sensing objects, radar unit 113 may additionally sense the speed and/or heading of the objects. LIDAR unit 112 may sense objects in an environment, for example a driving environment in which an autonomous vehicle is located, using lasers. LIDAR unit 112 may include one or more laser sources, a laser scanner, and one or more detectors, among other system components. Cameras 111 may include one or more devices to capture images of the environment, such as the driving environment surrounding the autonomous vehicle. Cameras 111 may be still cameras and/or video cameras. A camera may be mechanically movable, for example, by mounting the camera on a rotating and/or tilting platform.

In some embodiments, depending on the application (e.g., autonomous driving vehicle), sensor system 101 may further include other sensors, such as, a sonar sensor, an infrared sensor, a steering sensor, a throttle sensor, a braking sensor, and an audio sensor (e.g., microphone). An audio sensor may be configured to capture sound, for example from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

Data collection engine 102 may collect and store sensor data generated by sensor system 101 at different points in time. In the example of an autonomous driving vehicle, sensor data may include vehicle data indicating the driving commands (e.g., throttle, brake, steering commands) issued and responses of objects (e.g., speeds, accelerations, decelerations, directions) captured by the sensors of the sensor system 101 at different points in time. The sensor data may also include object information that indicates a position (e.g., x, y, z coordinates) and reflectivity of each object (e.g., a car, a pedestrian, a motorcycle, a bicycle, a bus, a truck, a building, traffic related signs (e.g., stop signs, yield signs), etc.) within the environment.

In one embodiment, the collected sensor data may be provided to data labelling engine 103 to automatically attach or tag a label (e.g., a number of characters) to the sensor data of each object. In another embodiment, data labelling engine 103 may automatically tag a label to the sensor data of a group of objects. Accordingly, data labelling engine 103 may generate labelled data that includes sensor data of a number of objects (or groups of objects) along with their corresponding data labels. Generally, the sensor data is tagged with meaningful labels that are informative such that the labels sufficiently describe the sensor data, although the labels can be of any combination of characters.

Using the labelled data from data labelling engine 103, machine learning engine 104 may generate or train a set of rules, algorithms, and/or predictive models (e.g., deep learning architectures such as deep neural networks, convolutional deep neural networks, deep belief networks and/or recurrent neural networks) to classify the objects or groups of objects and determine the behaviors of the objects or groups of objects.

In some embodiments, some or all of components 101-104 of machine learning system 100 may be implemented as part of an autonomous driving system (e.g., autonomous driving vehicle), an air and terrestrial traffic control, an air-defense system, an antimissile system, an aircraft anti-collision system, an ocean surveillance system, or the like.

Figure 2A:
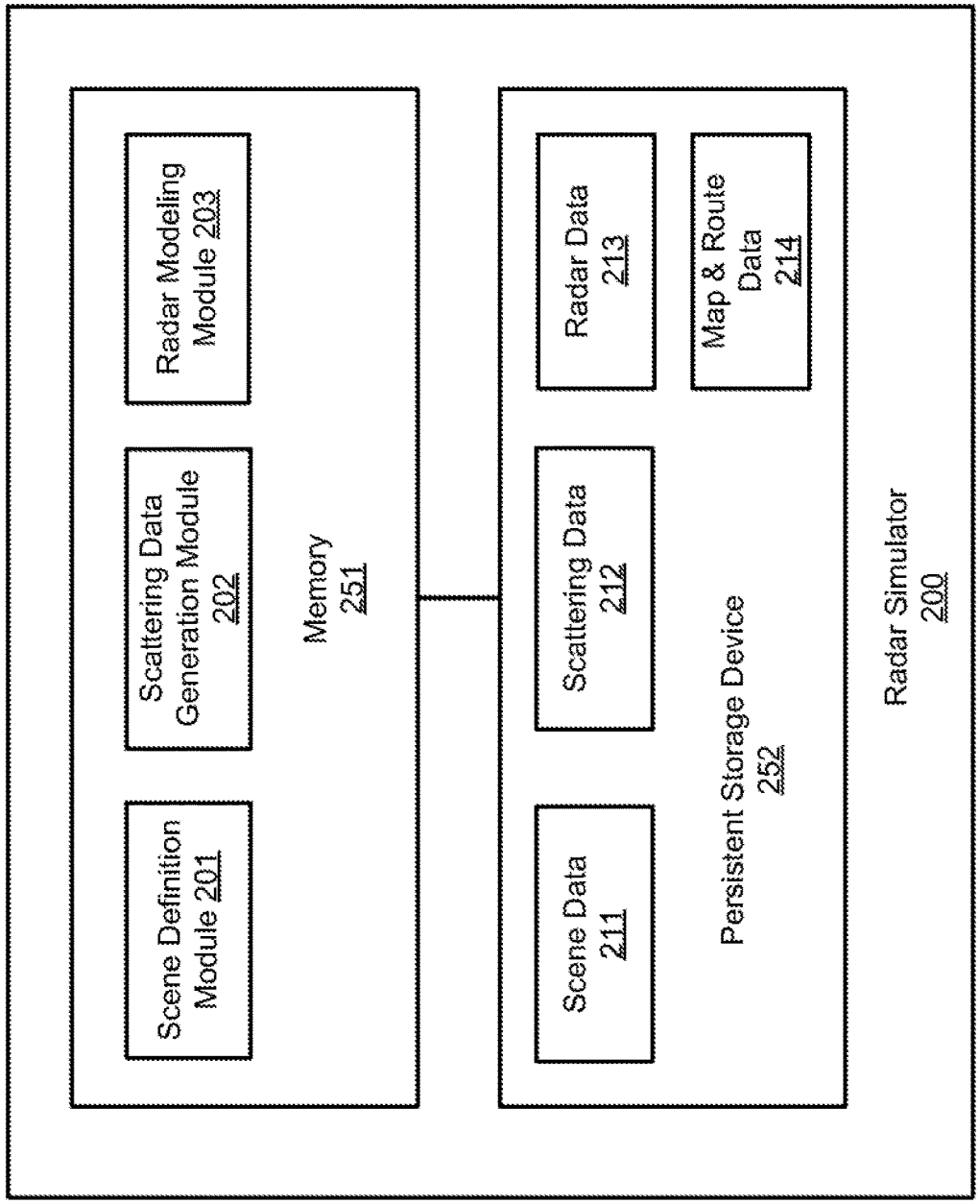
FIGS. 2A-2B are block diagrams illustrating an example of a radar simulator according to one embodiment.
Figure 2B:
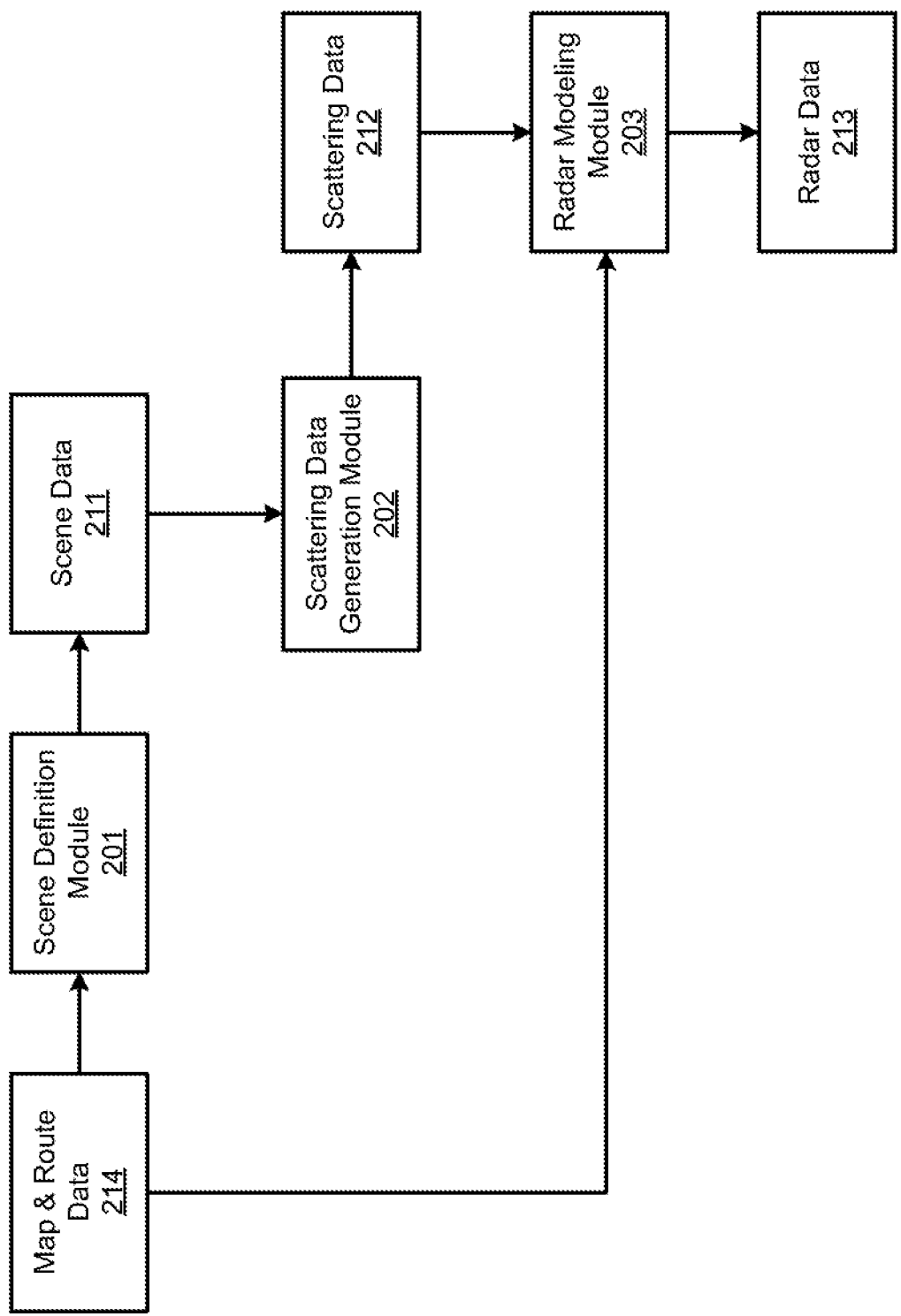

FIGS. 2A-2B are block diagrams illustrating an example of a radar simulator according to one embodiment. Referring to FIGS. 2A-2B, radar simulator 200 includes, but is not limited to, scene definition module 201, scattering data generation module 202, and radar modeling module 203. Radar simulator 200 may be seen as a computing (or data processing) system that simulates the functionalities of a radar system or unit. Some or all of modules 201-203 may be implemented in software, hardware, or a combination thereof. For example, these modules may be installed in persistent storage device 252, loaded into memory 251, and executed by one or more processors (not shown). Note that some or all of modules 201-203 may be integrated together as an integrated module.

In one embodiment, based on map and route data or information 214, scene definition module 201 may define or model one or more scenes (e.g., virtual scenes) that represent real-world scenes or scenarios. For example, scene definition module 201 may obtain location and route information from a location server, and a map and point of interest (MPOI) server. The location server provides location services and an MPOI server provides map services and the POIs of certain locations, which may be cached as part of map and route information 214. In one embodiment, for an autonomous driving vehicle application as an example, scene definition module 201 may use location and route information and MPOI information from map and route information 214 to define one or more scenes or scenarios. Depending on particular location information and MPOI information, each scene may include a number of objects, for example a car, a pedestrian, a motorcycle, a bicycle, a bus, a truck, a building, traffic related signs (e.g., stop signs, yield signs), etc., positioned at different or same locations. In one embodiment, to define the scene, scene definition module 201 may invoke a geometric primitive algorithm (e.g., polygonal primitives) to model the scene. The scene may be represented by a three-dimensional (3D) model having one or more mesh profiles. In one embodiment, scene definition module 201 may assign user-selected or predetermined values to a set of object parameters describing each object within the scene, thereby producing a number of sets of objects parameters describing the objects in the scene. The object parameters, for example, may include the object's position, speed, heading direction, acceleration or deceleration, turning angle, size, simulation angle, etc. The defined scene and object parameters may be stored as part of scene data 211.

Based on scene data 211, scattering data generation module 202 may load or generate scattering data 212 (also referred to as scatterers or scattering centers) associated with each defined scene included in scene data 211. That is, scattering data 212 may be used to construct RCS data (e.g., RCS signatures or patterns) representing the objects within the scene. In one embodiment, scattering data generation module 202 may obtain scattering information (e.g., electromagnetic (EM) or radar scattering centers) from a scattering data harvester (e.g., scattering data server). The scattering information may be previously captured and collected for real-world scenes or scenarios at different points in time. Thus, scattering data generation module 202 may extract data from the obtained scattering information that includes specific scattering information of a real-world scene or scenario represented by a particular defined scene. In another embodiment, based on scene data 211 (e.g., modeled scene and object parameters), scattering data generation module 202 may generate the scattering information using an EM or radar scattering simulator. Such scattering simulator (e.g., Xpatch® simulation tool) is generally well known to people of skill in the art. Accordingly, the extracted scattering information and/or the generated scattering information may be stored as part of scattering data 212.

Using scattering data 212 and map and route data 214, radar modeling module 203 may identify each object within a defined or modeled scene in accordance with one or more radar sensing models, such as, for example frequency-modulated continuous wave (FMCW), multistatic (e.g., multiple input multiple output (MIMO)), Doppler, monopulse, passive, etc. In one embodiment, using map and route data 214, radar modeling module 203 may determine location information of the object within the scene. Furthermore, radar modeling module 203 may analyze scattering data 212 to calculate or predict one or more RCSs of an object which are used to determine or construct an RCS signature for the object. Knowing what the RCS signature of an object looks like is helpful in identifying the object. Based on the location information and RCS signature of the object, radar modeling module 203 may determine radar information of the object (e.g., position, range, altitude, direction of movement, speed, acceleration, deceleration, etc.) in accordance with the radar sensing model(s). The radar information of the object may be stored as part of radar data 213. Radar data 213 may be stored on persistent storage device 252 (as shown) and/or may be sent over a network to a remote storage system (not shown) for storage and subsequent usage, as discussed in more detail with respect to FIGS. 3A-3B herein below.

It should be appreciated that radar simulator 200 is not limited to any particular application. That is, radar simulator 200 may be used to provide radar data for any system, such as autonomous driving systems (e.g., autonomous vehicle), air and terrestrial traffic control, air-defense systems, anti-missile systems, aircraft anti-collision systems, ocean surveillance systems, and the like.

Figure 3A:
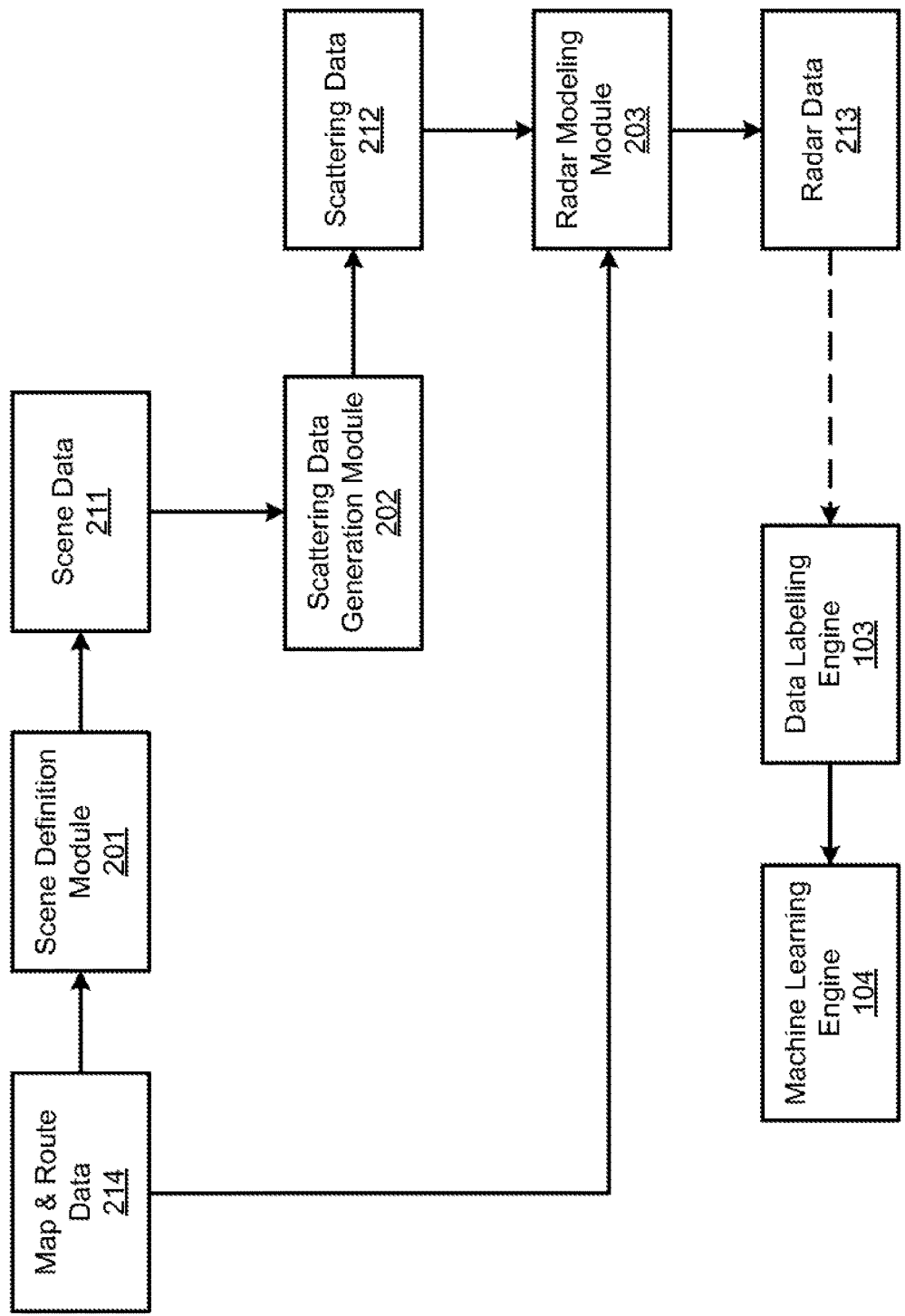
FIGS. 3A-3B are block diagrams illustrating exemplary embodiments for using radar data.
Figure 3B:
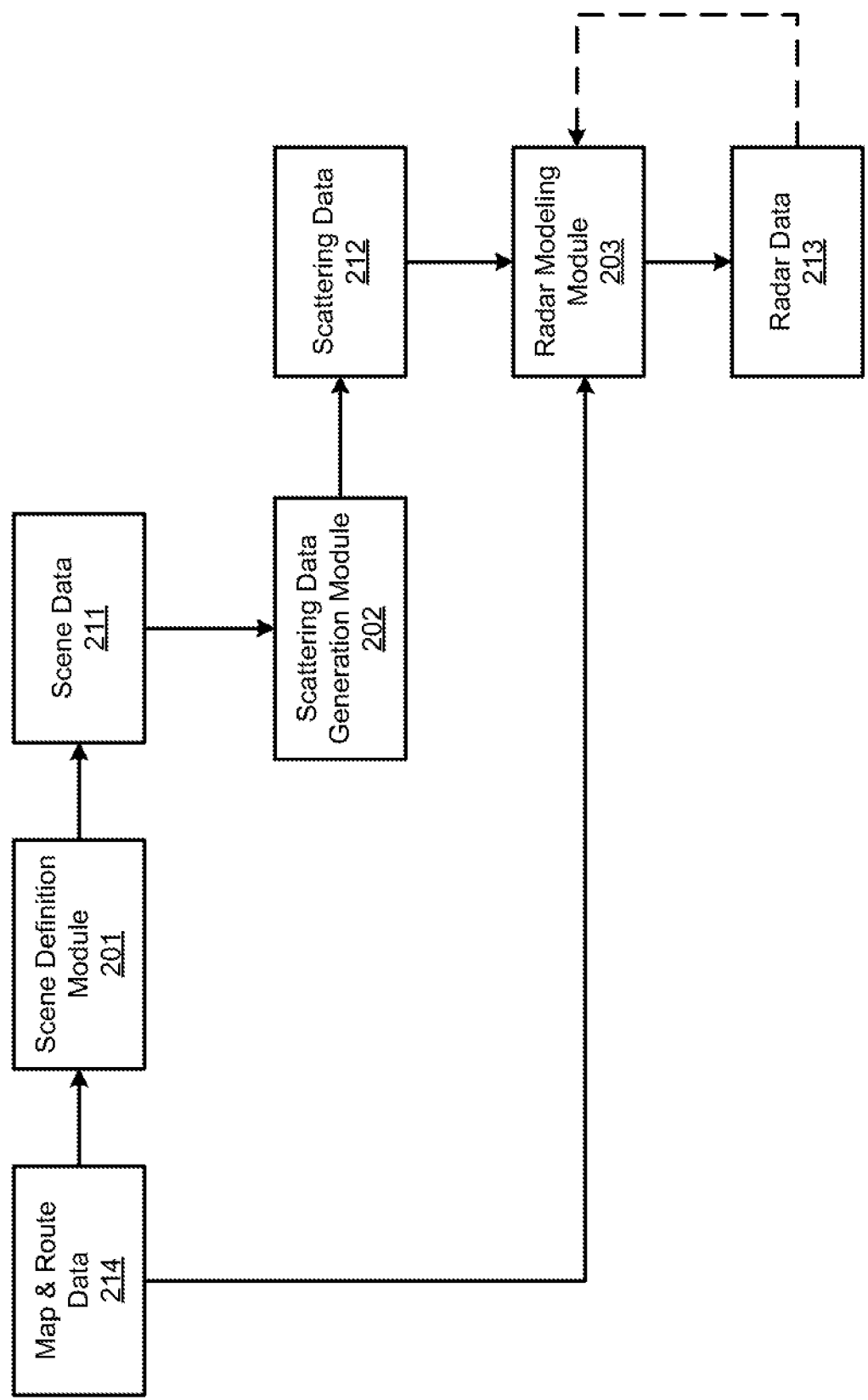

FIGS. 3A-3B are block diagrams illustrating exemplary embodiments for using radar data. Referring to FIG. 3A, in one embodiment radar data 213 may subsequently be used to classify objects. More specifically, as shown in FIG. 3A, radar data 213 may be provided to data labelling engine 103 to attach a label to radar information of each object within a modeled scene. The labelled radar information of each object may be provided to machine learning engine 104 to train a set of rules, algorithms, and/or predictive models (e.g., deep learning architectures such as deep neural networks, convolutional deep neural networks, deep belief networks and/or recurrent neural networks) that classify the object, for example, as a car, a pedestrian, a motorcycle, a bicycle, a bus, a truck, a building, a traffic related sign, etc. Machine learning engine 104 may also train a set of rules, algorithms, and/or predictive models to determine the behavior of the object. The trained set of rules, algorithms, and/or predictive models (e.g., an object classification predictive model) may be deployed, for example, on an autonomous driving vehicle for perception and planning (e.g., object classification) within a driving environment in real-time using, for example, a radar device or unit of the autonomous vehicle in order to control the autonomous vehicle. In this way, the time-consuming process of generating and collecting radar data, for example by driving a vehicle having a radar system mounted thereon through numerous locations, can be avoided.

In another embodiment, radar data 213 may be used as part of a design and test of a radar system. For example, in FIG. 3B, radar modeling module 203 may represent a design of a particular radar system. Therefore, after generating radar data 213, radar data 213 may be fed back to radar modeling module 203 (i.e., feedback loop) which enables radar modeling module 203 to adjust its performance to meet a desired output (e.g., desired output radar data).

Figure 4:
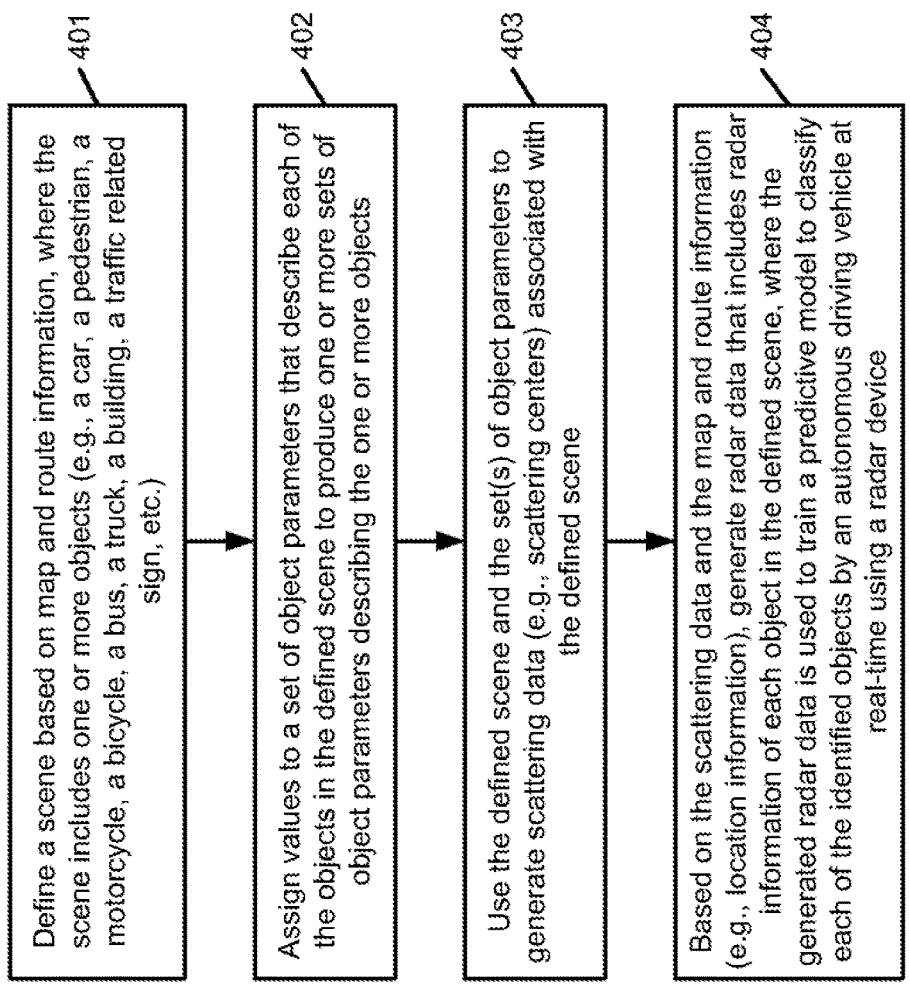
FIG. 4 is a flow diagram illustrating an example of a method of generating radar data according to one embodiment.

FIG. 4 is a flow diagram illustrating an example of a method of generating radar data according to one embodiment. Process 400 may be performed by processing logic which may include software, hardware, or a combination thereof. For example, process 400 may be performed by radar simulator 200 of FIG. 2A.

Referring to FIG. 4, at block 401, the processing logic defines a scene based on map and route information, where the scene includes one or more objects (e.g., a car, a pedestrian, a motorcycle, a bicycle, a bus, a truck, a building, a traffic related sign, etc.) At block 402, the processing logic assigns values to a set of object parameters that describe each of the objects in the defined scene to produce one or more sets of object parameters describing the one or more objects. At block 403, the processing logic uses the defined scene and the set(s) of object parameters to generate scattering data (e.g., scattering centers) associated with the defined scene. At block 404, based on the scattering data and the map and route information (e.g., location information), the processing logic generates radar data that includes radar information of each object in the defined scene, where the generated radar data is used to train a predictive model to classify each of the identified objects by an autonomous driving vehicle at real-time using a radar device.

Figure 5:
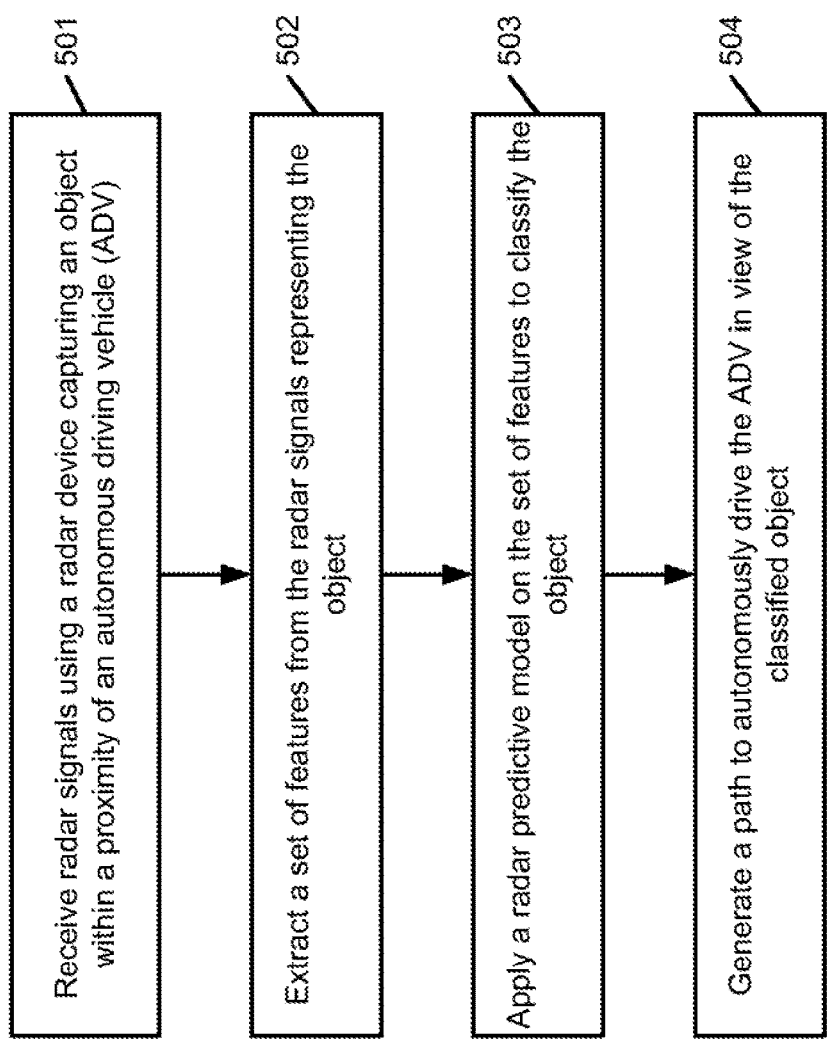
FIG. 5 is a flow diagram illustrating an example of a method of controlling an autonomous driving vehicle according to one embodiment.

FIG. 5 is a flow diagram illustrating an example of a method of controlling an autonomous driving vehicle according to one embodiment. Process 500 may be performed by processing logic which may include software, hardware, or a combination thereof. For example, process 500 may be performed by a perception and planning system (not shown) of an autonomous driving vehicle.

Referring to FIG. 5, at block 501, the processing logic receives radar signals using a radar device capturing an object within a proximity of an autonomous driving vehicle (ADV). At block 502, the processing logic extracts a set of features (e.g., radar information) from the radar signals representing the object. At block 503, the processing logic applies a radar predictive model (e.g., a trained object classification predictive model) on the set of features to classify the object (e.g., a car, a bus, a truck, a motorcycle, a pedestrian, a building, a traffic related sign, etc.). At block 504, the processing logic generates a path to autonomously drive the ADV in view of the classified object. For example, some or all of the functions of the autonomous vehicle may be controlled or managed by the perception and planning system, especially when operating in an autonomous driving mode. The perception and planning system includes the necessary hardware (e.g., processor(s), memory, storage) and software (e.g., operating system, planning and routing programs) to receive information from a sensor system (which may include the radar device), a control system, a wireless communication system, and/or a user interface system, process the received information, plan a route or path from a starting point to a destination point, and then drive the autonomous vehicle based on the planning and control information (which may include classification information of the classified object).

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 6:
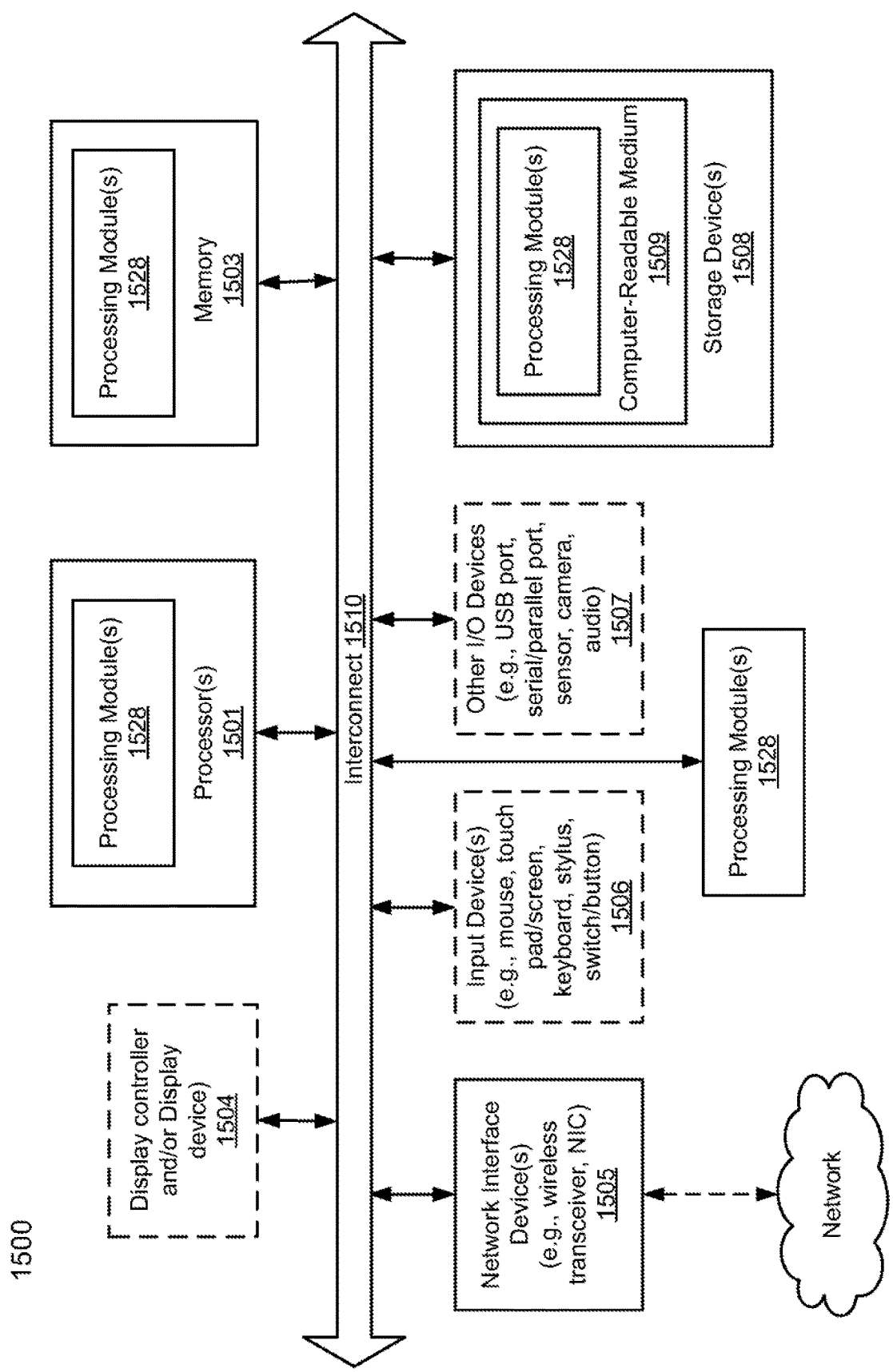
FIG. 6 is a block diagram illustrating a data processing system according to one embodiment.

FIG. 6 is a block diagram illustrating an example of a data processing system which may be used with one embodiment of the disclosure. For example, system 1500 may represent any of data processing systems described above performing any of the processes or methods described above, such as, for example, radar simulator 200 of FIG. 2A and perception and planning system of the ADV. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, scene definition module 201, scattering data generation module 202, and radar modeling module 203. Processing module/unit/logic 1528 may also represent any module/unit/logic performed by the perception and planning system of the ADV. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICs, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method of generating radar data for autonomous driving, the method comprising:
defining a scene based on map and route information, wherein the scene includes one or more objects;
assigning values to a set of object parameters that describe each of the objects in the defined scene to produce one or more sets of object parameters describing the one or more objects;
using the defined scene and the one or more sets of object parameters to generate scattering data associated with the defined scene; and
based on the scattering data and the map and route information, generating radar data that includes radar information of each object in the defined scene, wherein the generated radar data is used to train a predictive model to classify each of the identified objects by an autonomous driving vehicle at real-time using a radar device.

2. The method of claim 1, wherein generating radar data that includes radar information of each object in the defined scene comprises:
for each of the objects in the defined scene,
determining location information of the object based on the map and route information, and
predicting one or more radar cross sections (RCSs) of the object using the scattering data.

3. The method of claim 2, wherein generating radar data that includes radar information of each object in the defined scene further comprises:
for each of the objects in the defined scene,
constructing an RCS signature for the object using the one or more RCSB, and
determining the radar information of the object based on the location information and the RCS signature for the object.

4. The method of claim 1, wherein the scattering data is generated based on (i) scattering information obtained from a scattering data server, or (ii) scattering information generated using a radar scattering simulation.

5. The method of claim 1, wherein the set of object parameters includes at least one of: position, speed, heading direction, acceleration or deceleration, turning angle, size, or simulation angle.

6. The method of claim 1, wherein the radar information of each object is determined in accordance with one or more radar sensing models.

7. A non-transitory machine-readable medium having instructions stored therein, which when executed by a processor, cause the processor to perform operations for generating radar data, the operations comprising:
defining a scene based on map and route information, wherein the scene includes one or more objects;
assigning values to a set of object parameters that describe each of the objects in the defined scene to produce one or more sets of object parameters describing the one or more objects;
using the defined scene and the one or more sets of object parameters to generate scattering data associated with the defined scene; and
based on the scattering data and the map and route information, generating radar data that includes radar information of each object in the defined scene, wherein the generated radar data is used to train a predictive model to classify each of the identified objects by an autonomous driving vehicle at real-time using a radar device.

8. The non-transitory machine-readable medium of claim 7, wherein generating radar data that includes radar information of each object in the defined scene comprises:
for each of the objects in the defined scene,
determining location information of the object based on the map and route information, and
predicting one or more radar cross sections (RCSs) of the object using the scattering data.

9. The non-transitory machine-readable medium of claim 8, wherein generating radar data that includes radar information of each object in the defined scene further comprises:
for each of the objects in the defined scene,
constructing an RCS signature for the object using the one or more RCSB, and
determining the radar information of the object based on the location information and the RCS signature for the object.

10. The non-transitory machine-readable medium of claim 7, wherein the scattering data is generated based on (i) scattering information obtained from a scattering data server, or (ii) scattering information generated using a radar scattering simulation.

11. The non-transitory machine-readable medium of claim 7, wherein the set of object parameters includes at least one of: position, speed, heading direction, acceleration or deceleration, turning angle, size, or simulation angle.

12. The non-transitory machine-readable medium of claim 7, wherein the radar information of each object is determined in accordance with one or more radar sensing models.

13. A data processing system, comprising:
a processor; and
a memory coupled to the processor to store instructions, which when executed by the processor, cause the processor to perform operations for generating radar data, the operations including
defining a scene based on map and route information, wherein the scene includes one or more objects;
assigning values to a set of object parameters that describe each of the objects in the defined scene to produce one or more sets of object parameters describing the one or more objects;
using the defined scene and the one or more sets of object parameters to generate scattering data associated with the defined scene; and
based on the scattering data and the map and route information, generating radar data that includes radar information of each object in the defined scene, wherein the generated radar data is used to train a predictive model to classify each of the identified objects by an autonomous driving vehicle at real-time using a radar device.

14. The data processing system of claim 13, wherein generating radar data that includes radar information of each object in the defined scene comprises:
for each of the objects in the defined scene,
determining location information of the object based on the map and route information, and
predicting one or more radar cross sections (RCSs) of the object using the scattering data.

15. The data processing system of claim 14, wherein generating radar data that includes radar information of each object in the defined scene further comprises:

for each of the objects in the defined scene,
constructing an RCS signature for the object using the one or more RCSB, and
determining the radar information of the object based on the location information and the RCS signature for the object.

16. The data processing system of claim 13, wherein the scattering data is generated based on (i) scattering information obtained from a scattering data server, or (ii) scattering information generated using a radar scattering simulation.

17. The data processing system of claim 13, wherein the set of object parameters includes at least one of: position, speed, heading direction, acceleration or deceleration, turning angle, size, or simulation angle.

18. The data processing system of claim 13, wherein the radar information of each object is determined in accordance with one or more radar sensing models.

* * * * *